United States Patent [19]

Haskell et al.

[11] 3,853,591

[45] Dec. 10, 1974

[54] PHOSPHATE COATED POLYMERIC SHAPED OBJECTS

[75] Inventors: Vernon C. Haskell, Richmond, Va.; Larry L. Hench, Gainesville, Fla.; Paul C. Yates, Wilmington, Del.

[73] Assignee: E. I. du Pont de Nemours and Company, Wilmington, Del.

[22] Filed: Feb. 7, 1973

[21] Appl. No.: 330,389

Related U.S. Application Data

[63] Continuation-in-part of Ser. No. 273,301, July 19, 1972, which is a continuation-in-part of Ser. No. 182,641, Sept. 22, 1971, abandoned.

[52] U.S. Cl. ............... 117/47 A, 117/72, 117/76 F, 117/169 R, 161/191
[51] Int. Cl. ...................... C01b 25/36, B32b 27/06
[58] Field of Search... 117/169 R, 138.8 R, 138.8 F, 117/46 FC, 76 F; 161/191, 231

[56] References Cited

UNITED STATES PATENTS

| | | | |
|---|---|---|---|
| 2,786,787 | 3/1957 | Florio | 117/169 R |
| 2,909,451 | 10/1959 | Lawler et al. | 117/169 R |
| 3,772,060 | 11/1973 | Birchall et al. | 117/69 |
| 3,785,845 | 1/1974 | Birchall et al. | 117/76 F X |

*Primary Examiner*—Ralph Husack

[57] ABSTRACT

Organic polymeric shaped objects, such as films, coated with aluminum and/or ferric orthophosphate or a specific atom ratio, and a process for their preparation using colloids or solutions of the coating material are improved by replacing up to 50 percent of the metal ions with tin, titanium or zirconium ions.

6 Claims, No Drawings

PHOSPHATE COATED POLYMERIC SHAPED OBJECTS

CROSS-REFERENCE TO RELATED APPLICATION

This is a continuation-in-part of copending application Ser. No. 273,301, filed July 19, 1972 which is in turn a continuation-in-part of copending application Ser. No. 182,641, filed Sept. 22, 1971, now abandoned.

BACKGROUND OF THE INVENTION

In the preparation of thermoplastic polymeric films and the like, it is often necessary to modify the permeability or surface characteristics of the finished product to impart characteristics not exhibited by the film itself. Accordingly, many different classes of coating materials have previously been used to modify the characteristics of thermoplasatic materials. Of the inorganic materials used for coating, continuous, glassy coatings are known to provide excellent moisture and gas barrier properties. However, such materials are generally difficult to apply to the polymer surface, and particularly good barrier materials are continually sought for coatings.

SUMMARY OF THE INVENTION

The present invention provides coated structures having remarkably improved moisture and gas impermeability which are easily and economically prepared.

Specifically, the instant invention provides an improvement in an organic, polymeric shaped article having a substantially continuous, gas impermeable coating on at least one surface thereof, the coating comprising metal orthophosphate wherein the metal is aluminum or iron and the atom ratio of metal to phosphorus is about from 2.3 to 0.5, which improvement consists in replacing up to about 50 percent of the metal ions with tin, titanium, or zirconium ions.

Preferably, coated films of the invention further comprise a sealable polymeric coating applied over the phosphate coating.

The coated shaped articles can be prepared by applying to an organic, polymeric shaped article an improved coating composition comprising a dispersion comprising metal ions as defined above and orthophosphate ions wherein the atom ratio of metal to phosphorus is about from 2.3 to 0.5, and drying the coated film at elevated temperatures to remove excess solvent.

DETAILED DESCRIPTION OF THE INVENTION

Shaped articles which can be used in the instant invention include films, containers, bottles, fibers and the like prepared from polyesters, polyalkyls such as polypropylene and polyethylene and copolymers thereof including ionomers, the perfluoro polymer prepared from tetrafluoroethylene and hexafluoropropylene, polyacrylonitrile, polyvinyl chloride, polyvinylidene chloride, polyvinyl floride, polystyrene, polyimides, polyamides, cellulose acetate, cellophane and the like. Of these, polyester films such as oriented heat-set polyethylene terephthalate and oriented linear polypropylene films are particularly preferred.

The coatings of the instant invention contain either aluminum or iron orthophosphate or combinations thereof with atom ratios of the metal to phosphorus of about from 2.3 to 0.5. It has been found that these compositions provide excellent barrier properties for thermoplastic films. Up to 50 percent of the metal ions are replaced by tin, titanium, or zirconium ions. It is preferred that about 5 to 40 percent of the metal ions be replaced by tin, titanium, or zirconium ions.

When the metal orthophosphate consists essentially of aluminum orthophosphate, an atom ratio of about from 1.3 to 0.8 has been found to give particularly good barrier properties. In the case of ferric orthophosphate, atom ratios of 1.2 to 0.6, and particularly 0.65 to 0.95, have been found to give especially good barrier properties.

The coatings of the present invention are in a substantially glassy, or noncrystalline state. The presence of minor percentages of isolated crystals, however, will not depreciate the moisture and gas barrier properties of the coatings.

The metal orthophosphate can be applied to the polymeric substrate in the form of a colloidal dispersion or solution. The medium can be water or an organic solvent such as methanol, acetonitrile or dimethylformamide. Aqueous solutions have been found particularly convenient for most applications, but methanol can be used in a dispersion to replace all or part of the water. Ethanol can be used as the medium by itself when additives such as melamine formaldehyde resin are not used. Organic solvents are beneficial for use in coating normally water-sensitive substrates such as cellophane. Organic solvents should be selected, of course, so that the orthophosphate coating elements are either soluble or dispersable in the solvent. As will be similarly evident to those skilled in the art, polar solvents, preferably having a high dielectric constant, should be used in view of the ionic character of the inorganic salts used to formulate the present coatings.

The dispersion can be prepared by first dissolving in the desired medium any composition that will, in solution, yield the desired ions. Representative sources of aluminum ion include aluminum chlorhydroxide, aluminum chloride ($AlCl_3 \cdot 6H_2O$), basic aluminum acetate, or aluminum orthophosphate such as that commercially available from the Monsanto Company as "Alkophos." Similar sources of ferric ion can be used, such as ferric chloride ($FeCl_3 \cdot 6H_2O$), ferric nitrate or ferric bromide. Sources of phosphate ion that can be used, in addition to the aluminum orthophosphate indicated above, include phosphoric acid or water-soluble phosphate salts, e.g., sodium orthophosphate or the like, as long as the metal ion is subsequently removed by ion exchange or dialysis. The aluminum or iron and phosphate sources should be added in quantities that will result in atom ratios of aluminum or iron to phosphorus within the required limits. Metals other than aluminum or iron can be added, for example, as halides of the metal.

In the substitution of metals for the aluminum or iron in the present coatings, differing procedures should be used in the preparation of the coating compositions. For example, when tin is used in conjunction with aluminum, a coating composition can be prepared using 86 percent phosphoric acid, 50 percent aluminum chlorhydroxide solution and $SnCl_4 \cdot 5H_2O$. The coating composition can be prepared by first dissolving the phosphoric acid in water, followed by the addition of the aluminum chlorhydroxide. The $SnCl_4 \cdot 5H_2O$ can then be added with stirring, after which "Rexyn 201"

or a similar ion exchange resin is added to remove chloride. The order of addition in this formulation is important, since the addition of the tin compound directly to the phosphoric acid would result in precipitation, while the indicated order of addition ties up the phosphoric acid to avoid precipitation.

A substantially similar order of addition can be used when titanium comprises part of the coating formulation. Using titanium tetrachloride in the preparation of the coating solution or dispersion, it is helpful to predissolve the titanium tetrachloride, for example, as a 10 percent solution, in ice water to dissipate the heat of reaction with water. It has also been found beneficial to stabilize the colloid with up to about 25 percent chloride ion. Similar procedures are helpful when incorporating zirconium into the coating formulation, using a 20 percent aqueous solution of basic zirconyl chloride. Magnesium, chromium and zinc can be incorporated as the chlorides of these metals using the same general procedures as outlined for the addition of tin.

The concentration of the dispersion is not critical to the invention and can be adjusted to satisfy the requirements of coating apparatus used and final coating thickness desired. In general, the dispersions have a solids content of less than about 6 percent, when used with kiss or doctor roll coating techniques.

The coating dispersions are applied in such quantities to give a final coating weight of about from 0.1 to 0.6 g./m.$^2$, to give the desired barrier properties.

In the event that sources of metal are used that result in the formation of HCl or chloride ions, the removal of the HCl so formed is necessary to insure the good barrier properties of the invention, and to achieve wettability of the dispersion onto the polymer surface. It has been found that when $AlCl_3$ or $FeCl_3$ are used as the source of aluminum or iron, the removal of about 90 percent of the chloride ion is necessary. This removal can be effected, for example, by dialysis or by means of an ion exchange resin such as "Rexyn 201," commercially available from Fisher Scientific Company. By contrast, chloride removal is not generally necessary when aluminum chlorhydroxide, basic aluminum acetate or "Alkophos" are used to prepare the coating colloid. In geneal, it is desirable to remove as much chloride ion as possible without causing the colloidal sol to gel prematurely.

The dispersion can also contain additives such as resins that improve the wettabililty and adhesion of the coatings to the base to which they are applied. Additives which have been found particularly effective in this application include melamine formaldehyde resins, urea formaldehyde resins, polyethylenimine, and amino acids such as glycine and alanine alone or in combination. Particular resins that can be used include "Accobond 3524" trimethylolmelamine modified with iminobispropylamine, "Cymel 300" hexamethoxymethylmelamine, and "Cymel 450" melamine formaldehyde resin. Of these, "Accobond 3524" is particularly preferred because of its wetting characteristics coupled with its protection of coating barrier properties upon heating. In general, up to about 50 percent, by weight of the phosphate, of such additives can be used in the coating. The additive is conveniently incorporated into the dispersion after the addition of the phosphate-containing compound and before the addition of the iron or aluminum ions.

The dispersion can be coated onto one or both sides of the substrate using any conventional coating technique including, for example, kiss coating, doctor rolls, gravure rolls, immersion coating techniques, spraying, and the like, with or without such expedients as Mayer rods or air doctor knives. The dispersion is preferably applied to the polymeric substrate within a relatively short period after preparation, since extended aging of the dispersion, e.g., longer than 24 hours, permits slight gelation of the coating material. The coating thickness should be such as to give at least 0.02 g./m.$^2$ of the phosphate on the coated surface, and preferably about from 0.1 to 0.6 g./m.$^2$. The dispersion can be applied, for better adhesion, to a substrate that has been pretreated.

Treatments which can be used include flame treatment, electrical discharge treatment, as well as acid or alkaline etching of the substrate surface. In general, pretreatment by conventional flame or electrical discharge treatment is preferred. However, when a resin additive is used in the dispersion, the need for treatment of the base surface is frequently eliminated.

After application of the dispersion, the coated substrate is dried at elevated temperatures to remove excess water from the dispersion. Drying time and temperatures will vary widely, depending, for example, on the composition of the base polymeric article, the chemical composition of the coating, the concentration of the coating sol, the coating thickness, and the air flow in the drier. Coated films are conveniently dried by passing through a tower with radiant heat and countercurrent air flow. When organic solvents are used for application of the coatings, substantially all of the solvent should be removed, including the solvated residues that have become chemically attached to the inorganic oxides. The formation of a good barrier may in some cases be facilitated by the incorporation of small amounts of water, to assist in the removal of bulkier organic residues.

The coatings applied from aqueous systems should be dried to the normal water content of the coating, generally less than about 80% by weight of the coating. In general, the amount of water necessary in the coating will decrease with increasing quantities of adhesion-promoting additive, such as a melamine formaldehyde resin, present in the coating. Excessive residual water or incomplete drying can cause discontinuities in the coating. Similarly, drying at an exceptionally fast rate will disrupt the coating structure to give poor barrier properties.

After completion of the drying of the phosphate coating, the coated film can be further treated by priming and applying a sealable topcoat of a polymeric material such as polyethylene, vinylidene chloride polymers and copolymers, and ethylene vinyl acetate. Priming agents that can be used include silanes, polyurethanes, aqueous solutions of malemine formaldehyde resins, and aluminum chlorhydroxide. The top coating can be applied by solvent coating, conventional melt extrusion techniques, hot lamination of a performed film of the heat sealable polymer, or polymer dispersions. It has been found that the barrier properties of films of the invention are often markedly improved when sealable polymer topcoats are applied. The improvement so realized is generally substantially greater than the expected additive effect of the barrier properties of the two coatings.

The application of a sealable topcoat to the inorganic coatings of the present invention is particularly preferred for several reasons. In addition to imparting sealability to the surface, the topcoat improves the impact and abrasion resistance of the coated films of the present invention. In addition, the extent to which the coated films can be elongated without depreciating the barrier properties is increased. Most significantly, however, is the further improvement in barrier properties that the sealable topcoat provides. While the mechanism for this improvement is not fully understood, it is postulated that the sealable topcoat seals minute pores or fissures that are present in the organic barrier layer. In general, it is recognized that the total permeability ($P_t$) of a composite varies with the permeability of the individual components ($P_1$, $P_2$, etc.) by the following relationship:

$$1/P_t = 1/P_1 + 1/P_2$$

It has been found that the improvement realized through the applications of a sealable topcoat in accordance with the instant invention decreases gas and water vapor permeability to an extent greater than would be expected from this standard relationship.

After drying of the metal phosphate coating, the composition of the coating can be verified using an X-ray emission spectrometer equipped with chromium and tungsten target X-ray tubes, and sample holders permitting irradiation of flat film specimens. In the use of this equipment, any topcoat is first removed from the inorganic coating by immersing the film specimen in tetrahydrofuran or hot toluene, depending on the topcoat involved. The sample is then rinsed until free of polymer and dried in an oven for 10 minutes at 120°C. The film specimen is then irradiated in an X-ray spectrometer equipped with a chromium target tube and pentaerythritol crystal and scan angles. Peaks of intensity of secondary X-rays for aluminum phosphate will be observed at 89.40° for phosphorus and 144.67° for aluminum. A similar procedure can be used to identify ferric phosphate, using a tungsten target tube to identify and measure iron.

For measurements of the aluminum to phosphorus ratio, standard film samples should be prepared having known amounts of aluminum and phosphorus expressed in grams per unit area. The base film from the same lot as that used to make the standards should be available for a blank measurement of secondary radiation. Factors for both aluminum and phosphorus should be separately calculated by measuring the counts per unit time at 89.40° and at 144.67° for the known sample and subtracting the counts at the same setting for the blank and dividing grams per unit area of aluminum by the net counts. The counts per unit time from the test sample at 89.40° and 144.67° should then be measured and the counts from the blank subtracted, after which the result should be multiplied by the factor for aluminum. The procedure is then repeated for phosphorus and the atom ratio of aluminum to phosphorus is obtained by dividing the grams per unit area by the atomic weight and establishing the ratio.

The coatings of the present invention markedly improve the barrier properties of the base films to which they are applied. As indicated by the following examples, in certain of the compositions of the present invention, improvement is observed in the barrier against moisture under normal testing conditions. In other compositions, improvement is observed, as in Example 1, in the retention of barrier properties at elevated temperatures, even in the absence of additive such as melamine formaldehyde resin. This effect is not observed with the simple compositions such as aluminum and ferric orthophosphate. With still other compositions of the present invention, a remarkable improvement is observed, as in Example 3, in the retention of both moisture and gas barrier properties under humid conditions and this effect has been observed both at normal temperature and at temperatures in the region of 100°C.

The invention is further illustrated by the following examples. The oxygen permeability characteristics in the examples are measured on a cell connected to a mass spectrograph using helium transmission. The helium transmission was calibrated against oxygen transmission in a volumetric cell according to ASTM D-14-34-58. The oxygen permeability corresponds to that measured using an "Ox-tran 100" apparatus commercially available from Modern Controls, Inc. The moisture permeability is measured automatically by a Honeywell Model W825 water vapor transmission tester.

EXAMPLE 1

A colloidal dispersion is made by adding in turn to approximately 60 ml. of water with continuous stirring 3.58 g. of 86 percent orthophosphoric acid, 3.34 g. of aqueous aluminum chlorhydroxide which assayed 23.6% $Al_2O_3$, 4.79 g. of aqueous basic zirconyl chloride which assayed 20.2% $ZrO_2$, and, finally, diluting the mixture to 100 ml. In this composition, the ratio of metal atoms to phosphorus is 0.75, and of the metal atoms, two-thirds are aluminum and one-third is zirconium. The dispersion was applied to one side of 1.0-mil biaxially oriented, heat-set polyethylene terephthalate film, which had been previously flame treated for improved wettability, using a kiss roll applicator.

The coated film was dried in a radiant-heated chamber with the power to the radiant heater adjusted to give between ⅛ and ¼ inch shrinkage after drying in a web of polyester film 6.5 inches wide. The final coating weight was 0.20 g. per square meter.

The coated film exhibited a moisture permeability of 5.4 g. per 100 square meters per hour when the coating was placed towards the low humidity side of the testing chamber and 43.1 g. per 100 square meters per hour when the coating was placed towards the high humidity side of the test chamber. The oxygen permeability was 0.045 cc. per 100 square inches per 24 hours per atmosphere.

These permeability values for moisture and oxygen are equal to or lower than those which would be obtained when the same substrate is coated with an aluminum phosphate coating without the added zirconium compounds. Furthermore, when the above zirconium-containing film was subjected to oven treatment at 160°C. for 3 minutes, the moisture permeability with the coating facing the high humidity side of the test chamber was improved to a level of 9.2 g. per 100 square meters per hour. A comparable film coated with unmodified aluminum phosphate and oven treated in the same way was no better than an uncoated substrate film as a moisture or gas barrier.

EXAMPLE 2

A colloidal dispersion was made by adding to about 70 ml. of water with stirring in the following order: 3.70 g. of 86 percent phosphoric acid, 4.23 g. of aqueous aluminum chlorhydroxide solution which assayed 23.6% $Al_2O_3$, 1.61 g. of stannic chloride pentahydrate, and 14.7 g. of "Rexyn 201" which had an exchange capacity of 3.5 milliequivalents per gram of dry resin, and a dry weight fraction of 0.357. After the addition of the exchange resin, the mixture was stirred magnetically for 3 minutes and strained on 100-mesh stainless steel screen. To the stirred filtrate was added 1.4 g. of "Accobond 3524," a 30 percent aqueous solution of melamine formaldehyde resin available from American Cyanamid Corporation, and then enough water 100 ml. of solution. In this composition, the ratio of metal atoms to phosphorus is 0.76, and of the metal atoms, 81 percent are aluminum and 19 percent are tin.

The dispersion was applied to the flame treated side of 1.0-mil biaxially oriented, heat-set polyethylene terephthalate film and dried in the same manner as described in Example 1. The resulting coating thickness was 0.21 g. per square meter.

The moisture permeability of this coated film was 4.7 g. per 100 square meters per hour with the coating facing the low humidity side of the test chamber and 4.1 g. per 100 square meters per hour with the coating facing the high humidity side of the test chamber. The oxygen permeability was 0.09 cc. per 100 square inches per 24 hours per atmosphere.

EXAMPLE 3

This example describes the comparison between an aluminum phosphate coating and aluminum phosphate coating containing tin in their abilities to resist degradation of barrier properties at high humidity and high temperature. The sample sheets were enclosed in a polyethylene bag to allow exposure to moisture vapor but not to liquid water. The bag was placed in a vacuum desiccator containing liquid water in the bottom section and an open vacuum port. The desiccator was placed in the laboratory oven set at 100°C. Periodically, samples of the films were withdrawn and tested for moisture permeability. The film containing tin from Example 2 retained a moisture permeability of 39 g. per 100 square meters per hour after 50 hours of exposure at 100°C. and 100 percent relative humidity (RH). This can be compared with a moisture permeability of 120 g. per 100 square meters per hour for the substrate film without the inorganic barrier coating. The film coated with unmodified aluminum phosphate after being exposed for 1 hour at 100 percent RH and 100°C. gave a moisture permeability of 106 g. per 100 square meters per hour. These data show that the incorporation of the indicated amount of tin compound into the inorganic coating prolonged the time scale for degradation of moisture barrier by a factor of 50 to 100.

EXAMPLE 4

A stock solution of titanium tetrachloride in water was made up by adding slowly with stirring 10.0 g. of anhydrous titanium tetrachloride to 90 g. of crushed ice and diluting the mixture finally to 100 ml. with water. A colloidal dispersion was then prepared by adding to about 65 ml. of water, in order, 4.08 g. of 86 percent phosphoric acid, 3.43 g. of aqueous aluminum chlorhydroxide previously assayed at 23.6% $Al_2O_3$, 15.07 g. of 10 percent titanium tetrachloride, and 14.2 g. of "Rexyn 201," an ion exchange resin charged with hydroxyl ion and having a dry exchange capacity of 3.96 milliequivalents per gram and a dry weight fraction of 0.424. After continuous stirring for 3 minutes, the exchange resin was filtered by pouring the suspension through a 100-mesh stainless steel screen. To the filtrate was added 1.4 g. of "Accobond 3524" and the mixture was finally diluted to 100 ml. This composition had a ratio of metal atoms to phosphorus atoms of 0.72 and of the metal atoms 69 percent were aluminum and 31 percent were titanium.

After coating the film substrate and drying as in Example 1, the resulting film had a moisture permeability of 10.0 g. per 100 square meters per hour with the coating adjacent to the low humidity side of the test chamber and 10.6 g. per 100 square meters per hour with the coating toward the high humidity side of the test chamber. The oxygen permeability was 0.05 cc. per 100 square inches per 24 hours per atmosphere.

EXAMPLE 5

Aqueous colloidal dispersions were made by adding to about 70 ml. of water, in turn, 86 percent orthophosphoric acid, ferric chloride hexahydrate and stannic chloride pentahydrate in the amounts tabulated below. "Rexyn 201," an ion exchange resin charged with hydroxyl ions was added and the mixture was stirred for 3 minutes. The exchange resin had an exchange capacity of 4.1 milliequivalents per gram of dry solids, and the dry weight fraction was 0.45. After filtration through 100-mesh stainless steel screen, the mixture was diluted to 100 ml. with water.

After coating on one side of 1-mil polyethylene terephthalate film as described in Example 1, the properties were as listed below:

| | | |
|---|---|---|
| $H_3PO_4$ (86%) | 3.60 | 3.62 |
| $FeCl_3.6H_2O$ | 5.95 | 5.24 |
| $SnCl_4.5H_2O$ | 0 | 0.47 |
| $H_2O$ | dilute to | 100 ml. |
| *IPV g./100 m.²/hr. | 79/103 | 44.7/74 |
| $GTR.O_2$ cc./100 in.²/24 hr./atmos. | 0.50 | 0.55 |
| *Coating in low RH/Coating in high RH | | |

It is apparent that the moisture permeability of the ferric phosphate coating is markedly improved by the replacement of a portion of the iron by tin in these compositions.

We claim:

1. In an organic, polymeric shaped article having a substantially continuous, gas-impermeable coating on at least one surface thereof, comprising metal orthophosphate wherein the metal is aluminum or iron and the atom ratio of metal to phosphorus is about from 2.3 to 0.5, the improvement wherein up to about 50 percent of the metal ions is replaced by tin, titanium, or zirconium ions.

2. An article of claim 1 wherein about 5 to 40 percent of the metal ions is replaced by tin, titanium, or zirconium ions.

3. An article of claim 1 wherein the shaped article is a film.

4. An article of claim 3 further comprising a sealable topcoat on at least one surface of the film.

5. An article of claim 4 wherein the sealable surface topcoat is applied to the metal orthophosphate surface.

6. In a biaxially oriented polyethylene terephthalate film having been treated with electrical discharge to promote adhesion, having a substantially continuous, gas-impermeable coating on at least one surface thereof comprising aluminum orthophosphate in which the ratio of aluminum to phosphorus is about from 1.3 to 0.8, the coating further comprising about from 5 to 20 percent by weight of adhesion-promoting additive, the film further comprising a polyvinylidene chloride topcoat on the surface of the aluminum orthophosphate coating, the improvement wherein about 5 to 40 percent of aluminum ions is replaced by tin, titanium, or zirconium ions.

* * * * *